United States Patent [19]

Nagy et al.

[11] Patent Number: 5,845,931
[45] Date of Patent: Dec. 8, 1998

[54] INSTRUMENT PANEL HAVING INTEGRATED AIRBAG DEPLOYMENT DOOR

[75] Inventors: Paul W. Nagy, Sterling Heights; Lawrence M. Ozga, Rochester Hills, both of Mich.

[73] Assignee: Textron Automotive Company Inc., Troy, Mich.

[21] Appl. No.: 5,384

[22] Filed: Jan. 9, 1998

[51] Int. Cl.⁶ ................................................ B60R 21/20
[52] U.S. Cl. .................. 280/728.3; 280/728.1; 280/732
[58] Field of Search .............. 280/728.3, 732, 280/728.1

[56] References Cited

U.S. PATENT DOCUMENTS 5,211,421  5/1993  Catron et al. ........................... 280/732
5,451,075  9/1995  Parker et al. ......................... 280/728.3
5,673,930  10/1997 Coleman ............................. 280/728.2

*Primary Examiner*—Eric D. Culbreth

[57] ABSTRACT

An instrument panel assembly has an airbag deployment door and a preformed seal member that seals against foam leakage at a retainer member and a rear edge of the door overlaps the retainer and sandwiches the preformed seal member in place to prevent leakage of foamed in place material between the retainer and the door; a connector member holds the seal member in place while providing for clean separation of the door from the retainer to enable the door to separate and swing outwardly from the main body portion of the retainer in response to deployment of the air bag.

12 Claims, 3 Drawing Sheets

INSTRUMENT PANEL HAVING INTEGRATED AIRBAG DEPLOYMENT DOOR

This invention relates to an instrument panel having an integrated airbag deployment door for normally concealing an inflatable airbag of the vehicle and more particularly to an improved seal arrangement for preventing foam leakage between a door and a retainer during manufacture of a foamed-in-place air bag closure.

BACKGROUND OF THE INVENTION

It is well known in automotive vehicles to mount an airbag beneath the instrument panel for deployment through an opening in the instrument panel. The opening in the panel is normally closed by a deployment door that is able to hinge open when the airbag is deployed to enable the bag to escape through the opening into the passenger compartment of the vehicle.

At present, there are two general approaches to incorporating the deployment door into the instrument panel structure. According to one approach, the instrument panel is preformed with a deployment opening that is subsequently closed by fitting the deployment door into the opening. In this case, the deployment door is formed separately from the instrument panel and is secured by a hinge to the rigid retainer structure of the instrument panel. U.S. Pat. No. 5,161,819 discloses such a separate door arrangement for an instrument panel. Although this approach is widely used, there are manufacturing difficulties encountered in achieving a proper and repeatable fit of the door within the opening.

The other general approach has been to form the door as an integral portion of the instrument panel's rigid retainer structure. In such case, the retainer is molded to include channels isolating the door and defining a frangible tear seam line for the door as shown in U.S. Pat. No. 5,154,444. Alternatively, as shown in U.S. Pat. No. 5,421,608, a retainer can have a door formed thereon prior to covering the retainer with a decorative skin and or/a decorative skin and foam material and wherein the door is configured to be hinged to the retainer and in some cases to have an overlapping relationship with the retainer to prevent inadvertent inward movement of the door when a force is applied to the overlying cover material. In each case the door to retainer interface is designed to enable the door to separate from the retainer at a predetermined force threshold for deployment of the airbag system. In such cases it is necessary to seal any gaps between the door and the retainer prior to applying foamed-in-place material between the retainer, door and an outer decorative cover.

An outer decorative cover of a thermoplastic material such as polyvinyl chloride or polyurethane formed as a skin layer or such a layer backed with such foamed-in-place material can be applied to the door and surrounding portion of the retainer and in such cases provides a cover that extends across the adjoining channel. Such covers can inhibit door opening in response to airbag deployment. Accordingly, it is present practice to locally preweaken the skin layer or skin layer backed with foam to provide a tear seam over the channel that is configured structurally to separate so as to permit proper operation of the airbag system. In many automotive interior applications the specifications call for an instrument panel retainer that is covered to enhance its aesthetics, hence necessitating the need for an outer skin layer or skin layer backed by foam of the type described above. In such cases the prior art method of sealing leakage through the gaps between the door and the retainer has been accomplished by use of a masking tape type gap seal. The foam material may not adhere to the masking tape material and thus can cause the overlying foam material to fragment during air bag deployment.

It would thus be desirable to provide a gap seal covering in an instrument panel having an integrated deployment door, but yet which seal offers little, if any, resistance to the outward opening of the deployment door and to accomplish such deployment without undue foam fragmentation.

SUMMARY OF THE INVENTION

According to the invention, an instrument panel assembly having an integral airbag deployment door is manufactured by molding a retainer from rigid plastics material having a main body portion mountable to support structure of the vehicle, an airbag deployment door portion, and a preformed seal member and wherein a rear edge of the door overlaps the retainer and sandwiches the preformed seal member in place to prevent leakage of foamed in place material between the retainer and the door while providing for foam adhesion to the door and to the retainer and wherein the seal member is held in place by a connector member that will readily separate from the retainer to enable the door to separate cleanly and swing outwardly from the main body portion of the retainer in response to deployment of the air bag.

A feature of the present invention is to provide such a seal arrangement wherein the seal member is a preformed member overlying a gap between the door and the retainer for sealing against leakage of foamed in place material through the gap and the connector member is configured to connect a rear edge of the door to the retainer while holding the preformed member in sealing relationship with the door and the retainer to prevent foam leakage through the gap during formation of foamed in place material on the door and the retainer; and wherein the connector member is separable from the retainer upon air bag deployment for releasing the door for forming an air bag deployment opening through the closure.

A further feature of the invention is to provide such an air bag closure wherein the rear edge of the door has an inner surface and the retainer has an outer surface; such inner surface overlapping such outer surface of the retainer at the gap; and wherein the gap extends across the width of the door at the rear edge thereof; and the seal member having a width corresponding to the width of the overlap to cover the inner surface and outer surface and to seal therebetween prior to placement of the foamed in place material.

A further feature of the present invention is to provide such an air bag closure wherein the overlapped rear edge, interposed preformed seal member and retainer are interconnected by the rear edge overlapping the retainer and the preformed seal member being located between rear edge and the retainer at the overlap; and by the connector member extending through the rear edge, the preformed seal member and the retainer and the seal member being made of foam material and being compressed between the rear edge and the retainer to prevent leakage of foamed in place material therebetween at the rear edge.

A further feature of the invention is to provide such an air bag closure wherein the connector member is a door hold down member that will pull from the retainer and remain on the door upon air bag deployment.

A still further feature of the present invention is to provide such a connector member as a rubber grommet.

Yet another feature is to provide such a rubber grommet having a head portion including a width substantially the same as the width of the preformed seal member and contacting the door edge at the outer surface thereof; and the rubber grommet extending through the preformed seal member, the retainer and the rubber grommet and including a flange thereon formed inboard of the inner surface of the retainer for drawing the head portion in a direction to secure the preformed seal member in sealed relationship with the door and the retainer for preventing foam leakage therebetween.

THE DRAWINGS

These and other features and advantages of the present invention will be readily appreciated as the same becomes better understood by reference to the following detailed description when considered in connection with the accompanying drawings, wherein.

DETAILED DESCRIPTION

Figure 1:
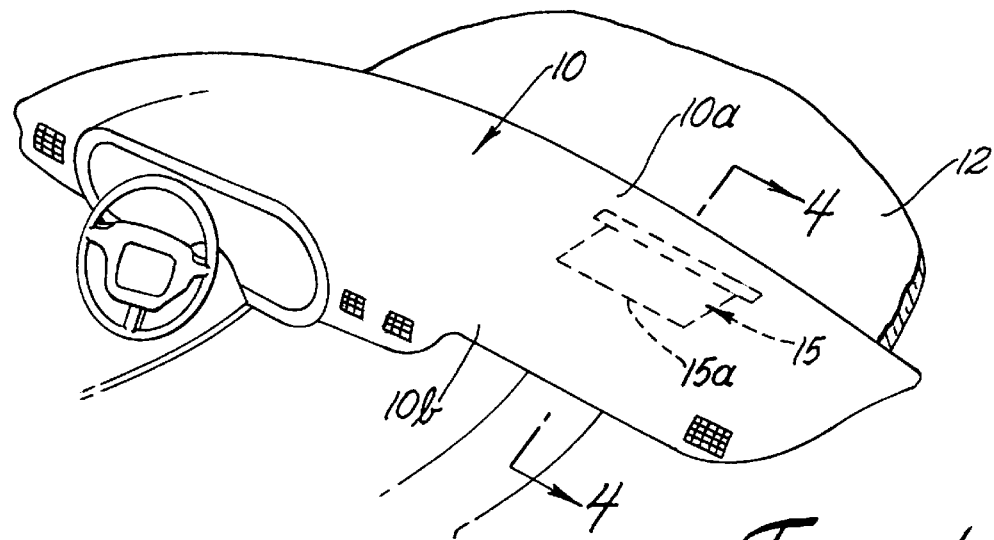
FIG. 1 is a diagrammatic perspective view of an instrument panel including a hidden door type air bag closure system.
Figure 4A:
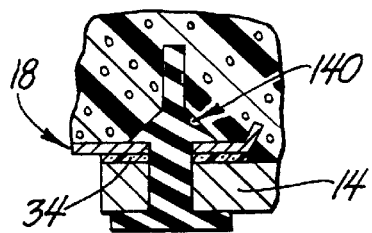
FIG. 4A is a cross-sectional view of another embodiment of the invention.
Figure 4:
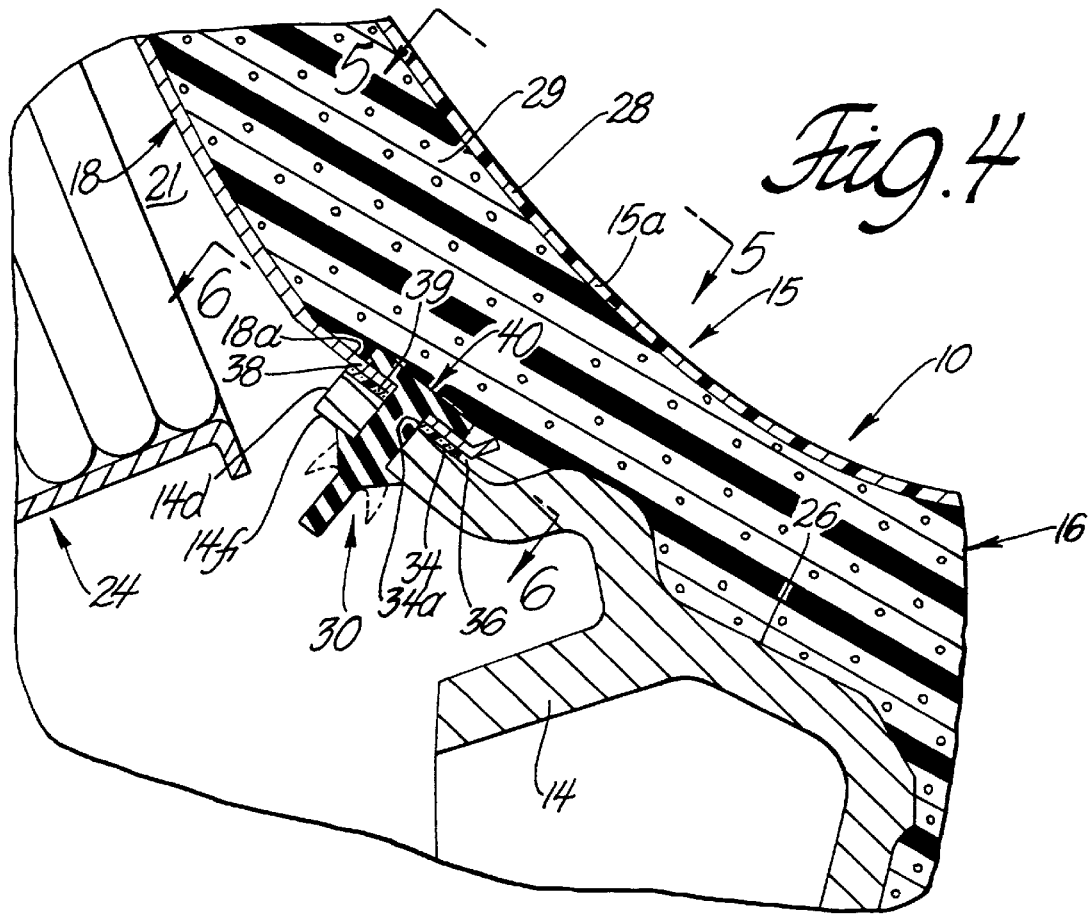
FIG. 4 is a diagrammatic cross-sectional view taken generally along line 4—4 of FIG. 1 showing an improved seal arrangement for providing foam shutoff between the retainer and door components thereof.

FIGS. 1 and 4 illustrate an instrument panel 10 located rearwardly of an automotive vehicle windshield 12 constructed according to a first presently preferred embodiment of the invention. The instrument panel 10 includes a rigid base panel or retainer 14 molded of rigid plastics material such as TPO (thermoplastic olefin), PP (polypropylene), PE (polyethylene) PC/ABS (polycarbonate-acrylonitrilebutadiene-styrene), ABS (acrylonitrile-butadiene-styrene), PU (polyurethane), having a main body portion mounting the panel 10 securely on rigid support structure of the vehicle (not shown). The instrument panel 10 includes an air bag cover 15 provided by a decorative covering 16 on the top front surface 10a of the instrument panel 10. The covering 16 overlies the retainer 14 and a door 18 to provide a hidden door configuration in which the door 18 is arranged to be hinged open about a front edge thereof and be directed through the decorative covering 16 upon air bag deployment at a rear edge thereof.

The retainer 14 is molded as a separate unit to include an integrated deployment door portion or passenger airbag door 18 that is either hinged or formed as one piece with the retainer 14 as is more specifically set forth, respectively, in U.S. Pat. No. 5,421,608 and U.S. Ser. No. 5,154,444. The door portion 18 has a rear edge 18a and a front hinged edge 18b. In this description, the front hinged edge 18b is connected by a hinge member 20 to the retainer.

As will be appreciated from the preceding paragraph, the adjectives used to indicate spatial relationships (e.g., top, horizontal, rear, front) indicate spatial relationship as they exist when the components of the air bag cover 15 are located in their intended orientation with the automobile. Thus, for example, rear edge 18a is so named because it is the edge of door 18 that is closest to the rear of the automobile when door 18 is installed in the automobile in its intended orientation. This convention is utilized through the specification and claims. Also, although the air bag cover 15 is shown being located in a top mount position, it will of course be appreciated that the deployment opening could be located on rear surface 10b of instrument panel 10 or at another location, depending upon the location of the air bag unit. The passenger air bag door 18 is hinged to the surrounding main body portion of the retainer 14 by a suitable hinge construction diagrammatically shown in FIG. 5 at 20. It should be understood that the hinge construction 20 is merely representative of one form of hinge with others being suitable for use with the present invention including separate hinge connections that are riveted or connected by other fasteners to the retainer and to the front edge 18b of the door 18. Any suitable hinge arrangement will suffice as long as it provides pivotal movement of the door such that the rear edge 18a of the door 18 will move in a direction to break open the decorative covering 16.

Figure 5:
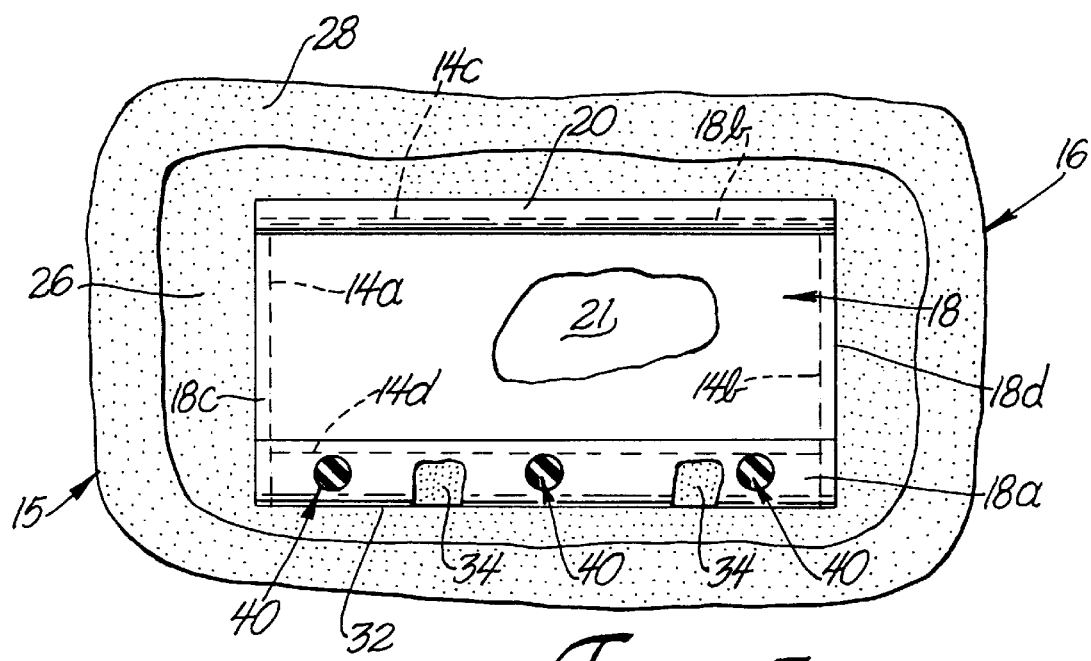
FIG. 5 is an enlarged, fragmentary top elevational view of the door in FIG. 1 with a decorative covering removed.
Figure 6:
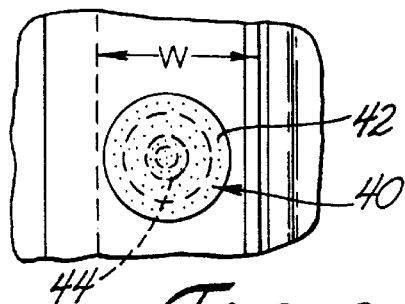
FIG. 6 is an enlarged fragmentary top elevational view of the seal arrangement in FIG. 4.
Figure 7:
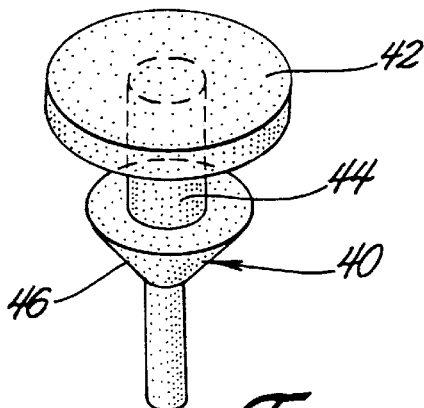
FIG. 7 is a perspective view of a connector member in the seal arrangement of FIG. 4.

As shown in FIG. 5, the side edges 18c, 18d of the door 18 are overlapped with side edges 14a, 14b of the retainer that along with a front edge 14c and rear edge 14d form a deployment opening 21 in the retainer 14 covered by the door.

The door 18 conceals an inflatable airbag 22 of a passenger safety inflatable restraint (PSIR) system 24 mounted beneath the instrument panel 10 and operated and controlled in conventional manner to protect against vehicle impacts.

The decorative covering 16 comprises a preformed outer skin of polyvinyl chloride or other plastic pliable material such as PVC/ABS (polyvinyl chloride acrylonitrile-butadiene-styrene), TPO (thermoplastic olefins), ASA (acrylonitrile-styrene-acrylic), ETP-TPO (blended elastomeric thermoplastic polymers and thermoplastic polyolefins) 28 backed by a foam layer 29 that is foamned-in-place material. An outer decorative cover of a thermoplastic material such as polyvinyl chloride or polyurethane formed as a skin layer or such a layer backed with such foamed-in-place material can be applied to the door and surrounding portion of the retainer and in such cases provides a cover that extends across the underlying foam and hidden door. Such covers can inhibit door opening in response to airbag deployment. Accordingly, it is present practice to locally preweaken the skin layer or skin layer backed with foam to provide a tear seam over the channel that is configured structurally to separate so as to permit proper operation of the airbag system. In the illustrated arrangement, the weakened tear seam is a U-shaped region best shown at 15a in FIG. 1. While a U-shaped seam is shown other geometry can be used, depending on the shape of the door. Suitable foams include PVC (polyvinyl chloride), PE (polyethylene), PP (polypropylene), PU (polyurethane).

The preformed skin 28 can be formed by processes such as those disclosed in U.S. Pat. Nos. 4,664,864 and 4,784,911 and incorporated herein by reference. The preformed skin 28 and retainer 14 are placed on opposed surfaces of a mold and are bonded together by the formation of a layer 29 foamed-in-place material. Such a process is described in U.S. Pat. No. 4,743,188, also incorporated by reference.

Any gaps between the door and retainer can cause leakage of such foamed-in-place material. Heretofore, such foam material required masking of abutting door and retainer surfaces to provide foam shut off at the openings between the door and the retainer. In the illustrated case, the surface fit between the door 18 and retainer 14 at its side edges is flat and easily sealed by known masking techniques.

Figure 2:
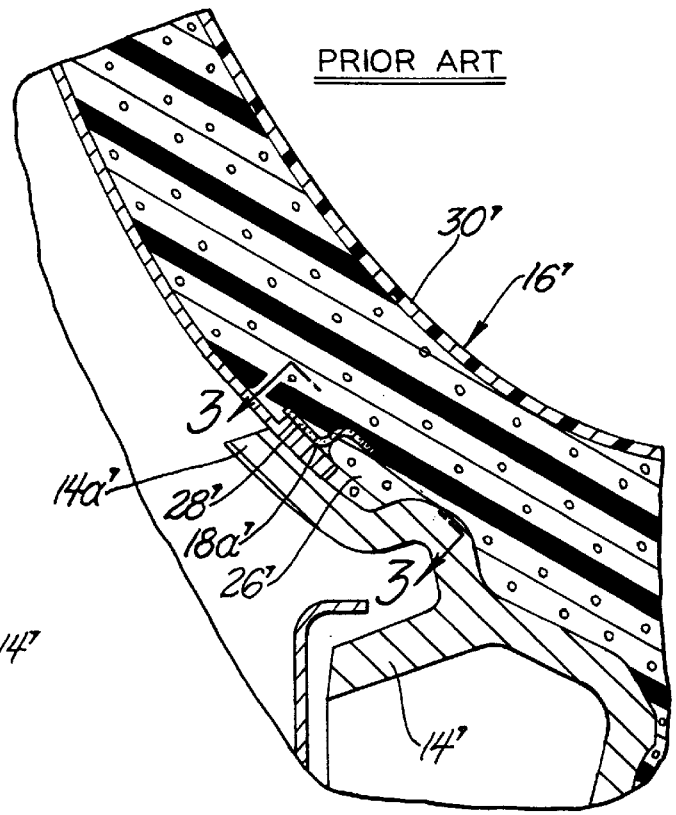
FIG. 2 is an enlarged fragmentary sectional view of a prior art arrangement for providing foam shut off between a retainer and a door in a hidden door type air bag closure system of the type shown in FIG. 1.
Figure 3:
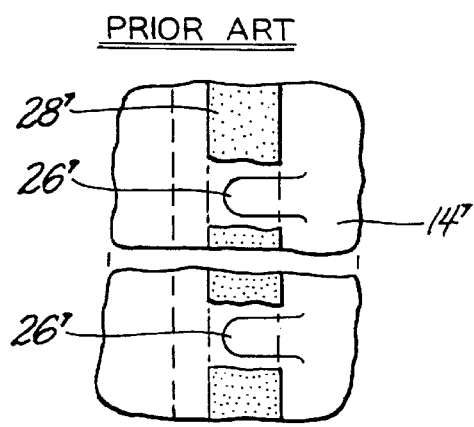
FIG. 3 is a fragmentary top elevational view of a seal arrangement in the prior art showing in FIG. 2 taken along the line 3—3 therein looking in the direction of the arrows.

As is best shown in FIGS. 2 and 3, past constructions of this type have also included laterally spaced tabs 26' on the front edge of the retainer 14'. Like components in the illustration of FIGS. 2 and 3 have the same reference numeral as in the description of the present invention but in the prior art arrangement the reference numerals are primed.

Thus, in the prior art arrangements, the rear edge 18a' of a door 18' can overlap a rear edge 14a' of retainer 14' where it is located by tabs 26'. A strip of masking tape 28' is applied across the tabs 26' and the outboard surface of the rear edge 18a' of the door 18' to provide foam shutoff between the door 18' and the retainer 14'. Such an arrangement is suitable for providing foam shutoff in arrangements where foamed-in-place material is directed on the door and the retainer to form a cushioned, decorative covering 16' that is finished with an outer skin layer 30'. The problem with such seal configurations is that the masking tape type seal at the rear edge 18a' of a door 18' is applied across an uneven surface including the raised surfaces defined by tabs 26'. Such sealing on an uneven surface can cause increased foam fragmentation as the door 18' is deployed through the overlying decorative covering 16' upon air bag deployment.

According to the present invention, the problem of foam fragmentation is addressed by the provision of a unique seal and holddown assembly 30 that will firmly secure the passenger air bag door 18 in place on the retainer 14 while providing a foam shut off configuration that will enable the rear edge 18a of the door to separate cleanly from the retainer 14 upon air bag deployment at even surfaces.

More specifically, the assembly 30 includes a rear flange 32 on the door 18 that overlaps the retainer 14. A preformed seal member 34 is sandwiched between the door 18 and the retainer to prevent leakage of foamed-in-place material therebetween at surfaces that are evenly formed, e.g., do not have abrupt raised or depressed regions as in the case of tabs 26'.

The preformed seal member 34 is preferably made of a compressible foam material though other seal types are equally suitable for use as long as they fill a gap 36 between the door 18 and the retainer 14 between opposed surfaces 38, 39 thereof.

The seal member 34 is held in place by laterally spaced connector members 40 that will readily separate from the retainer 14 to enable the door 18 to separate and swing outwardly from the main body portion 15 of the retainer in response to deployment of the air bag.

Figure 8:
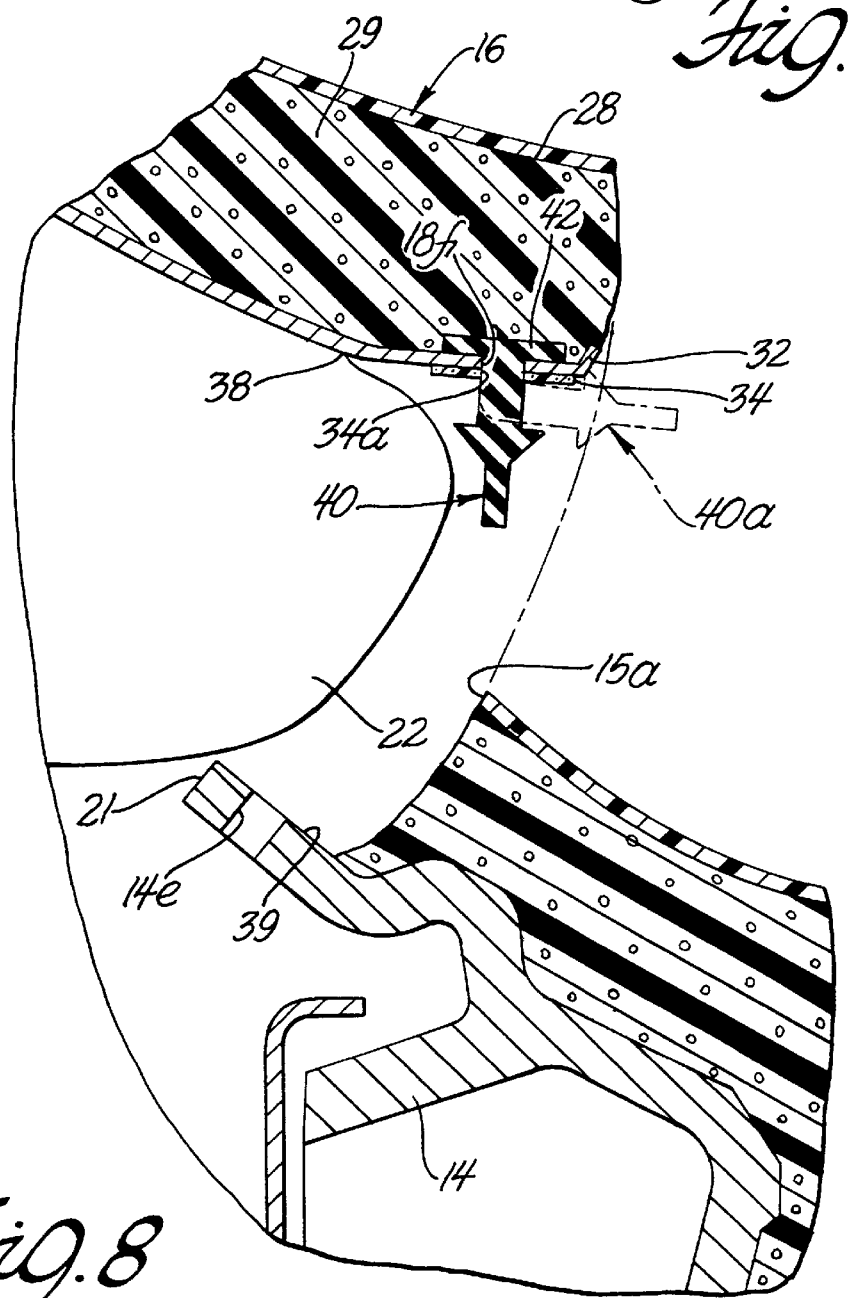
FIG. 8 is a diagrammatic view illustrating the seal arrangement of FIG. 4 following deployment of an air bag.

The seal member 34 is formed as a layer of preformed foam material that fills the gap 36 between the rear edge of the door 18 and the retainer 14 extending across the width of the door at the rear edge thereof for sealing against leakage of foamed-in-place material through the gap and and the connector member 40 is configured to connect a rear edge 18a of the door to the retainer 14 while holding the layer of preformed foam material 34 in sealed relationship with the door 18 and the retainer 14 to prevent foam leakage through the gap 36 during formation of foamed-in-place material on the door and the retainer. The connector member 40 is separable from the retainer 14 upon air bag deployment for releasing the door 18 for pivotal movement about hinge 20 to open the air bag deployment opening 21 through the closure, as shown in FIG. 8 so that the air bag 22 will be free to inflate into the passenger compartment. Alternatively, the connector member 40 could also be designed to be separable from the door 18 upon air bag deployment by inverting the connector member 40 as shown in FIG. 4A at 140.

The rear edge 18a has an inner surface defined by surface 38 and the retainer 14 has an outer surface defined by surface 39. The inner surface 38 overlaps the outer surface 39 of the retainer by a width W at the gap 36. The gap 36 extends across the door at the rear edge 18a thereof. The seal member 34 has a width W preferably corresponding to the width W of the overlap to cover the inner surface 39 and outer surface 38 and to fill the gap 36 and seal therebetween prior to placement of the foamed in place material.

The overlapped rear edge 18a and interposed preformed seal member 34 and retainer 14 are interconnected at the rear edge overlap since the connector members 40 extend through the rear edge as well as through the preformed seal member 34 and the retainer 14 for producing a biased seal between the rear edge 18a and the retainer 14 to prevent leakage of foamed-in-place material therebetween.

Each connector member 40 is a door hold down member that will pull out of the retainer 14 and remain on the door 18 upon air bag deployment as shown in FIG. 8. Each connector member 40 is configured such that there will be a clean separation between the rear edge 18a of the door 18 and the retainer such that the flange 32 on the door 18 will cleanly penetrate the overlying decorative cover and thereby reduce foam fragmentation. While a flange 32 is shown, the door 18 can have a straight edge that will perform the same foam/skin separation function.

In accordance with another aspect of the invention, the connector member is a rubber grommet 40.

Each rubber grommet 40 has a head portion 42 having a width substantially the same as the width of the preformed seal member 34. The head portion 42 contacts the door edge 18a at an outer surface thereof. The rubber grommet 40 has a shaft 44 that extends through aligned holes 18f, 34a and 14e formed respectively in door 18, the preformed seal member 34 and the retainer 14. Each rubber grommet includes a tapered flange 46 thereon formed inboard of the inner surface 14f of the retainer for securing the preformed seal member 34 in sealed relationship with the door and the retainer for providing foam shut off thereabetween. Consequently, the opposed surfaces of the front edge and the retainer will cleanly separate such that the flange 32 will be able to cleanly pass through the foam layer and the weakened part of the outer skin. During air bag deployment, the edge of tapered flange 46 will invert as shown in outline in FIG. 4. The shaft 44 and flange 46 will pull out of the hole 14e and the flange 46 will expand to lift the seal 34 from the retainer 14 as the flange 32 cleanly passes through the foam layer and a weakened part 15a of the outer skin 16 as shown in FIG. 8. The connectors 40 remain connected to the door edge 18a as the door 18 is pivoted open during air bag deployment into a passenger compartment and will yield as shown in broken line at 40a upon full air bag deployment.

The invention has been described in an illustrative manner with respect to presently preferred embodiments, and it is to be understood that the terminology that has been used is intended to be in the nature of words of description rather than words of limitation. Obviously, many modifications and variations of the present invention in light of the above teachings may be made. It is therefore to be understood that within the scope of the appended claims, the invention may be practiced otherwise than as specifically shown and described.

What is claimed is:

1. An air bag closure having a door impacted by an underlying air bag upon deployment thereof and a retainer for mounting said door within an instrument panel and said door having a rear edge mounted with respect to said retainer for forming a gap therebetween through which foam material is susceptible to leak during a foam process wherein a layer of foamed in place material covers the door and the retainer at the gap characterized by:

a preformed seal member overlying said gap for sealing against leakage of foamed-in-place material through said gap; a connector member releasably holding said rear edge of said door and said preformed seal member on said retainer and said preformed seal member being maintained thereby in sandwiched in sealing relationship with said door and said retainer to prevent foam leakage through said gap during formation of said foamed in place material against said door and said retainer; and said connector member being separable from at least one of said retainer and said door upon air bag deployment for releasing said door for forming an air bag deployment opening through the closure.

2. In the air bag closure of claim 1, said rear edge having an outer surface and said retainer having an inner surface, said connector member having a head portion contacting said rear edge at the outer surface thereof; said connector member extending through said preformed seal member and through said retainer; said connector member including a portion thereof inboard of the inner surface of said retainer for biasing said head portion in a direction to secure said preformed seal member in sealed relationship with said door and said retainer at said gap for preventing foam leakage thereacross.

3. In the air bag closure of claim 1, said rear edge having an inner surface and said retainer having an outer surface; said inner surface overlapping said outer surface of said retainer at said gap; said gap extending across the width of said door at the rear edge thereof; said preformed seal member having a width corresponding to said overlap to cover the inner surface of said rear edge and the outer surface of said retainer prior to placement of said foamed in place material.

4. In the air bag closure of claim 3, said connector member contacting said rear edge at the outer surface thereof; said connector member including a portion thereof inboard of the inner surface of said retainer for biasing said head portion in a direction to secure said preformed seal member in sealed relationship with said door and said retainer at said gap for preventing foam leakage thereacross.

5. In the air bag closure of claim 3, said connector member being a door hold down member that will pull from said retainer and remain on said door upon air bag deployment.

6. In the air bag closure of claim 5, said connector member being a rubber grommet.

7. In the air bag closure of claim 6, said rubber grommet having a head portion having a width substantially the same as the width of said preformed seal member and contacting said rear edge at the outer surface thereof; said rubber grommet having a shaft extending through said preformed seal member and through said retainer; said rubber grommet including a flange thereon located inboard of the inner surface of said retainer for securing said preformed seal member in sealed relationship with said door and said retainer at said gap for preventing foam leakage thereacross.

8. In the air bag closure of claim 1, said rear edge overlapping said retainer and said preformed seal member being located between said rear edge and said retainer at said overlap; and said connector member extending through said rear edge, said preformed seal member and said retainer for holding said preformed seal member between said door and said retainer at said gap prior to covering said door and said retainer with said foamed-in-place material.

9. In the air bag closure of claim 8, said rear edge having an outer surface and said retainer having an inner surface, said connector member having a head portion contacting said rear edge at the outer surface thereof; said connector member including a portion thereof inboard of the inner surface of said retainer for biasing said head portion in a direction to secure said preformed seal member in sealed relationship with said door and said retainer at said gap for preventing foam leakage thereacross.

10. In the air bag closure of claim 8, said connector member being a door hold down member that will pull from said retainer and remain on said door upon air bag deployment.

11. In the air bag closure of claim 10, said connector member being a rubber grommet.

12. In the air bag closure of claim 11, said rear edge having an outer surface and said retainer having an inner surface, said rubber grommet having a head portion having a width substantially the same as the width of said preformed seal member and contacting said rear edge at the outer surface thereof; said rubber grommet having a shaft extending through said preformed seal member and through said retainer; said rubber grommet including a flange thereon located inboard of the inner surface of said retainer for securing said preformed seal member in sealed relationship with said door and said retainer at said gap for preventing foam leakage thereacross.

* * * * *